UNITED STATES PATENT OFFICE.

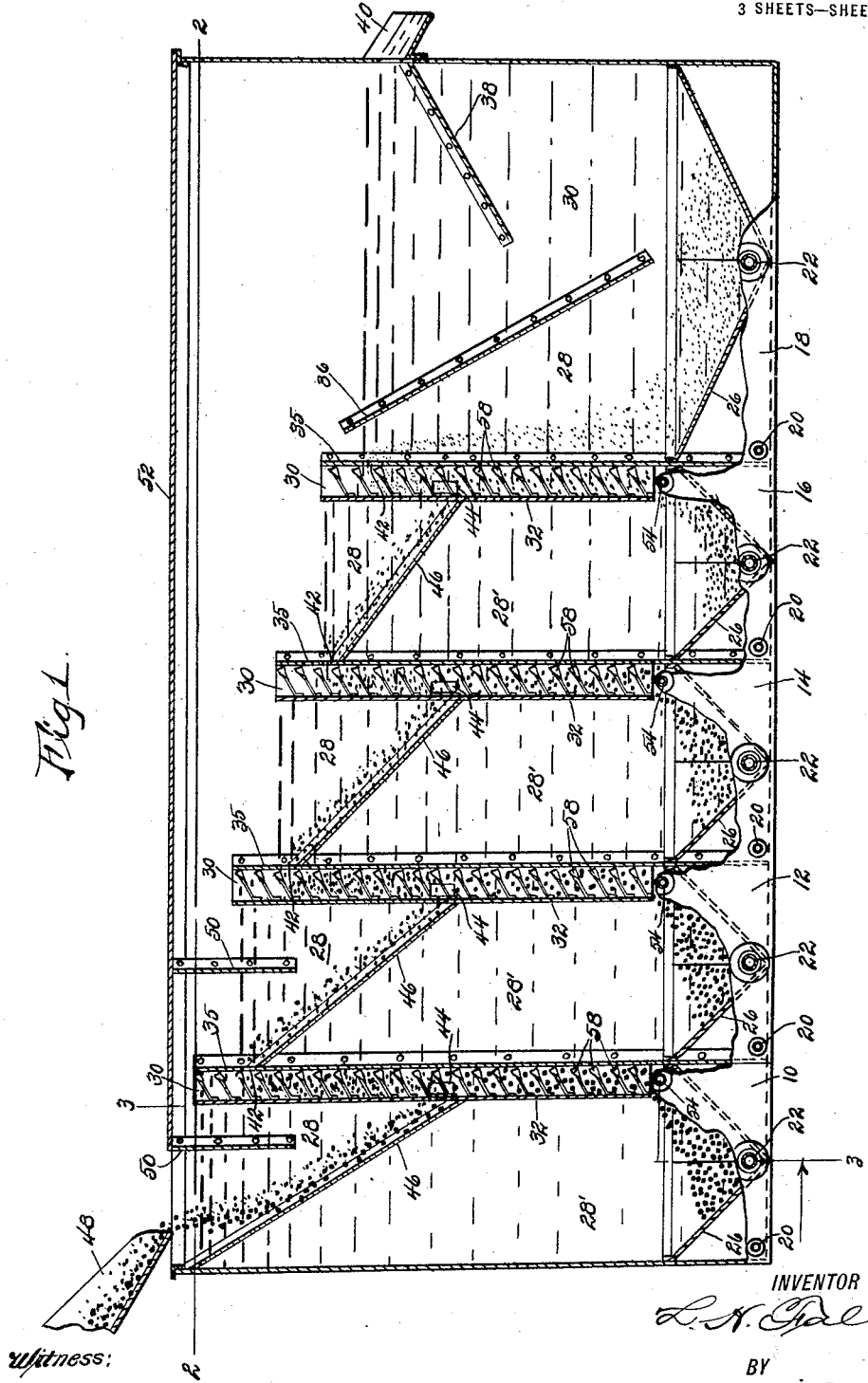

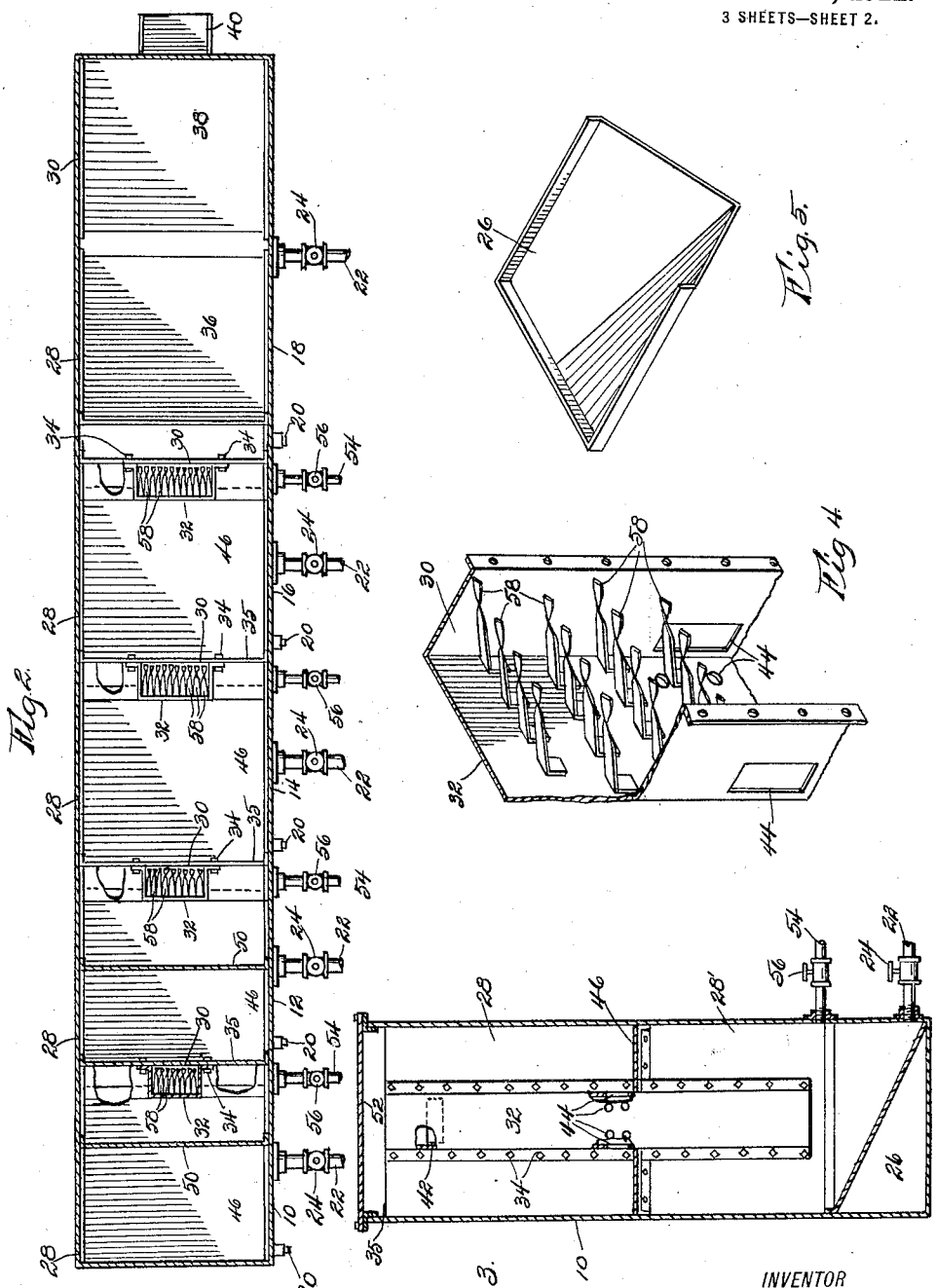

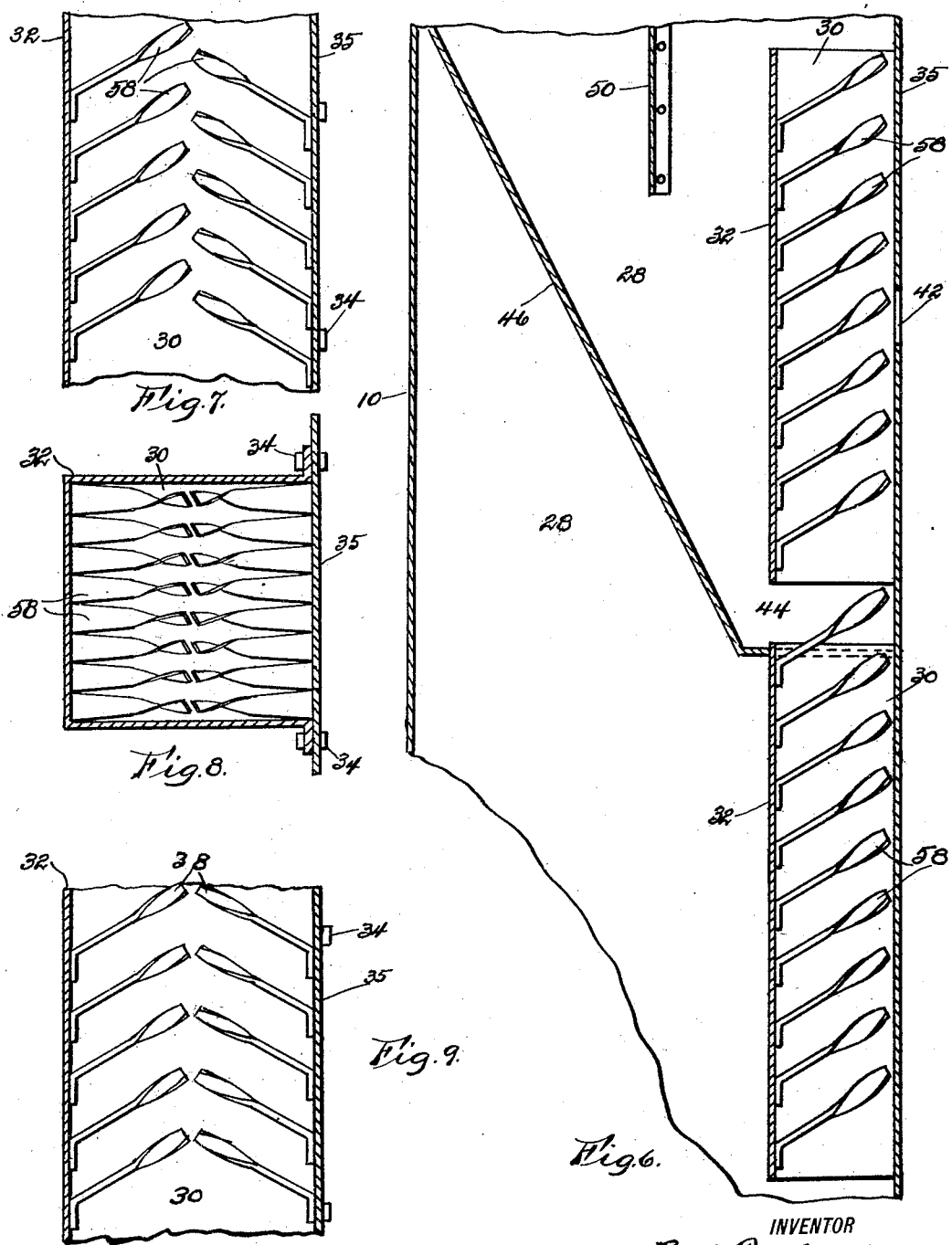

LEWIS H. FALLEY, OF KANSAS CITY, MISSOURI.

SEPARATING AND CLASSIFYING APPARATUS.

1,406,177.  Specification of Letters Patent.  Patented Feb. 14, 1922.

Application filed May 27, 1919. Serial No. 300,131.

*To all whom it may concern:*

Be it known that I, LEWIS H. FALLEY, a citizen of the United States, residing at Kansas City, in the county of Jackson, State of Missouri, have invented certain new and useful Improvements in Separating and Classifying Apparatus, of which the following is a complete specification.

The present invention relates to apparatus for use in the cleaning, separating, and classifying or sizing of granular substances or materials, and aims to provide an improved construction of such apparatus adapted to treat either materials heavier than water, or, under certain circumstances, materials which are lighter than water,—a suitable fluid medium being utilized in the carrying out of the cleaning or separating process.

To this end I have devised an improved tank structure comprised of down-flow and upflow compartments through which the material is conducted and in the course of which the flow of the material is so controlled and directed as to clean and divide out the particles of material and separate the same according to the desired classification.

One of the particular features of improvement comprises a novel form and arrangement of deflecting means which is interposed in the path of the material, preferably in the upflow compartments, by the operation of which deflecting means the flow of the material is so modified as to produce an improved and more effective action as regards the required treatment of said material.

With these general objects in view, as well as minor objects which will appear in the course of the detailed description, the invention will now be described with reference to the accompanying drawings illustrating a practical form of construction which has been devised for embodying the proposed improvements, after which those features deemed to be novel will be set forth and particularly defined in the appended claims.

In the drawings—

Figure 1 is a central longitudinal vertical sectional view showing a separating and classifying apparatus constructed in accordance with the present invention;

Figure 2 is a longitudinal horizontal section taken on the line 2—2 of Figure 1 (with portions of the structure broken away);

Figure 3 is a transverse section taken on the line 3—3 of Figure 1;

Figure 4 is an enlarged sectional detail perspective view of a portion of one of the upflow compartments;

Figure 5 is an enlarged perspective view of one of the hopper members for the bottom of each tank;

Figure 6 is an enlarged vertical sectional view of a portion of one of the tanks and showing a slight modification as to the form of communicating passage between the downflow and upflow compartments;

Figures 7 and 8 are vertical and transverse sectional views, respectively, showing an upflow compartment with a slightly modified arrangement of the improved deflecting elements; and Figure 9 is a vertical sectional view, similar to the view shown in Figure 7 but illustrating a slightly different arrangement of said deflecting elements.

Referring now to the said drawings in detail, these illustrate the apparatus as comprising a tank structure made up of a plurality of settling tanks 10, 12, 14, 16 and 18, of any desired size, shape and material, and each provided with a drain outlet 20 and with a discharge pipe 22 for the separated material, each pipe 22 being fitted with a valve 24. Each of the tanks is provided with a removable hopper member 26 in the bottom of the tank, the sides of which hopper member converge toward the opening into the corresponding discharge pipe 22 (see Figure 5).

Each of the tanks is subdivided into a downflow compartment 28 and an upflow compartment 30, for which purpose the tanks 10, 12, 14 and 16, are provided with channel-shaped partitions 32 secured by suitable fastenings 34 to the dividing walls 35 between the tanks; while the tank 18 is provided with oppositely inclined partitions 36, 38, the latter partition 38 inclining upwardly to the discharge chute 40 leading from said tank 18.

The partitions 32 are open at both top and bottom, so that the upflow compartments communicate at their lower ends with the lower end portions of the tanks, and may also overflow into the downflow compartment of the next succeeding tank,—the successive tanks being of gradually decreasing height, as illustrated in Figure 1. The upflow compartments 30 also communicate with the downflow compartments of the next succeeding tanks through discharge openings 42 in the dividing walls 35 of the tanks, at points below the tops of said succeeding tanks.

Further communication is provided between the downflow and upflow compartments by means of openings 44 through the partitions 32 at points below the level of the discharge openings and above the lower ends of said upflow compartments. Inclined transverse partitions 46 are provided in the first four tanks, the partition 46 in the tank 10 extending from approximately its upper end to a level below the openings 44; and in the tanks 12, 14 and 16, the partitions 46 extend from the lower margins of the discharge openings 42 to a level below the openings 44 in said tanks. In this way the partitions 46 separate the downflow compartments 28 from the space below said partitions above the hopper members 26, thus forming discharge compartments 28' in communication with the lower ends of the upflow compartments 30.

The material to be treated is fed into the first tank 10 by means of a chute 48 from which the material is discharged into the top of the tank and directed by the partition 36 into the first upflow compartment 30. The first two tanks 10 and 12 are preferably provided with relatively short vertical partitions 50 depending from the top 52 of the tank structure to a level below the top of the corresponding partitions 32, for the purpose of more effectively controlling the stream of the material, the flow of which is of course greatest in these two tanks.

Each of the tanks 10, 12, 14 and 16, is provided with an intake pipe 54 fitted with a valve 56 for furnishing a supply of fluid, such as water or air, to said tanks, the said pipes being connected to the tanks at the lower ends of the upflow compartments 30. An upward flow will thus be maintained in each of said upflow compartments. Each of these upflow compartments is also provided with a plurality of deflecting elements, preferably in the form of fingers 58 extending from front to rear at an upward incline transversely across said compartments, thus intercepting the flow of the material and also that of the fluid medium as it passes upward through said compartments. The free ends of these elements or fingers are also preferably formed with more or less of a twist, as clearly shown in Figure 4.

The operation of the apparatus as thus described will be clearly understood by reference to Figure 1 of the drawings, in which the use of the apparatus is illustrated in connection with a flow of water maintained through the pipe connections 54, with the water maintained in the several tanks at the approximate levels illustrated in said Figure 1. With material, such as ore or other granular substances heavier than water, the flow of said material descends to the partition 46 in the tank 10 and is directed thereby through the openings 44 into the first upflow compartment 30. Here it encounters the deflecting fingers and also the ascending flow of the fluid medium in said compartment 30, and the form and arrangement of said deflecting fingers 58 is such as to break up the upward flow in this compartment and impart cross-currents thereto, as well as a more or less of a twisting movement by means of the twisted outline of the free ends of said deflecting fingers. This action not only serves to thoroughly agitate the mass of material entering said compartment, but also facilitates the gravitation of the coarser particles of the material therein to the bottom of the compartment where it finds its way into the bottom of the tank within the hopper 26, from which it may be drawn off through the corresponding discharge pipe 22. The balance of the material is carried by the ascending current and through the opening 42 into the downflow compartment 28 of the next tank 12, where the same operation is repeated; and similarly, with the tanks 14 and 16, the classified products being drawn off through the several discharge pipes 22 from said tanks, and a still further classification being obtained from the discharge pipe 22 of the tank 18, from which the waste is discharged by the outlet chute 40.

The action of the apparatus may be effectively regulated by controlling the water flow from the various connections 54 into the upflow compartments for securing the proper and most effective rate of flow through the several separating compartments or units.

The contents of the discharge compartments 28' remain substantially stationary and afford an equalizing means for balancing the action of the apparatus at the various stages thereof, as well as facilitating the separation and discharge of the product from each unit of the apparatus.

In the case of granular materials which are lighter than water, a suitable medium, such as air, may be substituted in place of water, in which case it would merely be necessary to maintain the intake end of the apparatus reasonably airtight, as by means of a canvas hood or the like (not shown) in carrying out the operation.

In Figure 6, the passage 44 is shown as constructed by simply making the channel-shaped partition 32 in two sections spaced apart, so as to provide freer communication between the downflow and upflow compartments at the base of the transverse partition 46. In Figures 7 to 9, I illustrate two sets of deflecting fingers 58, arranged at opposite inclinations and converging toward each other and almost meeting at the middle of the upflow compartment, said fingers being arranged in somewhat staggered relation in Figure 7, and in approximately registering relation in Figure 9,—which modified arrangements may be found suitable for adapting the apparatus for slightly differing grades of materials.

It will of course be recognized that the number, size, shape or particular angle of the deflecting fingers is not important, these characteristics varying according to the conditions,—the function of these elements being to thoroughly break up both the mass of the material entering the upflow compartment and also the upward current of the fluid medium as above explained; and an incidental advantage of this feature of the construction is found in the fact that materially less water or air is required for carrying out the separating process by this means.

While I have illustrated and described one practical and efficient embodiment of the proposed improvements, I desire to reserve the right to make all such formal changes or modifications as may fairly fall within the scope of the appended claims.

Having described the invention, what I claim and desire to secure by Letters-Patent is:

1. An apparatus of the character described comprising a settling tank, a partition dividing said tank into a downflow settling compartment and an upflow settling compartment, means for feeding the material to be treated into the upper end of said downflow compartment, fluid-supply means communicating with the tank at the lower end of said upflow compartment, and a plurality of deflecting elements within said upflow compartment and arranged to produce cross-currents at various elevations therein, said partition being provided with a passage affording communication between said compartments above the lower end of said upflow compartment.

2. An apparatus of the character described comprising a settling tank, a partition structure dividing said tank into a downflow settling compartment and an upflow settling compartment and a discharge compartment below said downflow compartment and communicating with the lower end of said upflow compartment, means for feeding the material to be treated into the upper end of said downflow compartment, fluid-supply means communicating with the tank at the lower end of said upflow compartment, and deflecting means within said upflow compartment operative to produce cross-currents at various elevations therein, said downflow and upflow compartments communicating with each other at a level above the lower end of said upflow compartment.

3. An apparatus of the character described comprising a settling tank, a partition structure dividing said tank into a downflow settling compartment and an upflow settling compartment and a discharge compartment below said downflow compartment and communicating with the lower end of said upflow compartment, means for feeding the material to be treated into the upper end of said downflow compartment, fluid-supply means communicating with the tank at the lower end of said upflow compartment, and a plurality of spaced deflecting fingers projecting transversely within said upflow compartment in position to produce cross-currents at various elevations therein, said downflow and upflow compartments communicating with each other at a level above the lower end of said upflow compartment.

4. An apparatus of the character described comprising a settling tank, a partition structure dividing said tank into a downflow settling compartment and an upflow settling compartment and a discharge compartment below said downflow compartment and communicating with the lower end of said upflow compartment, means for feeding the material to be treated into the upper end of said downflow compartment, fluid-supply means communicating with the tank at the lower end of said upflow compartment, and a plurality of spaced deflecting fingers projecting transversely and at angles to the horizontal within said upflow compartment for producing cross-currents at various elevations therein, said downflow and upflow compartments communicating with each other at a level above the lower end of said upflow compartment.

5. An apparatus of the character described comprising a settling tank, a partition structure dividing said tank into a downflow settling compartment and an upflow settling compartment and a discharge compartment below said downflow compartment and communicating with the lower end of said upflow compartment, means for feeding the material to be treated into the upper end of said downflow compartment, fluid-supply means communicating with the tank at the lower end of said upflow compartment, and a plurality of spaced deflecting fingers projecting transversely within said upflow compartment and having twisted free-end portions for producing a combined cross-current and twisting movement of the upward flow through said upflow compartment at various elevations therein, said downflow and upflow compartments communicating with each other at a level above the lower end of said upflow compartment.

6. An apparatus of the character described comprising a plurality of settling tanks, a partition dividing each of said tanks into a downflow settling compartment and an upflow settling compartment, means for feeding the material to be treated into the upper end of the downflow compartment of the first of said tanks, fluid-supply means communicating with each of the tanks at the lower end of its upflow compartment, the said compartments of each tank also communicating with each other at a level below the lower end of the upflow compartment, the several upflow compartments of said tanks being arranged in communication with the downflow compartments of the next succeeding tanks at successively lower levels than the top of said first tank, and means for producing cross-currents at various elevations in said upflow compartments.

7. An apparatus of the character described comprising a plurality of settling tanks, a partition dividing each of said tanks into a downflow settling compartment and an upflow settling compartment communicating with each other at a level below the lower end of the upflow compartment, means for feeding the material to be treated into the upper end of the downflow compartment of the first of said tanks, fluid-supply means communicating with each of the tanks at the lower end of its upflow compartment, the several upflow compartments of said tanks being arranged in communication with the downflow compartments of the next succeeding tanks at successively lower levels than the top of said first tank, and means arranged within said upflow compartments for producing a combined cross-current and twisting movement of the upward flow through said compartments.

8. The method of separating particles of material possessing like characteristics from a stream of such material, which consists in producing a confined upward flow of said material under the influence of an upwardly moving current of fluid, and simultaneously effecting cross-currents in said combined stream of fluid and material, while allowing the separated particles of the material to gravitate out of said stream.

In witness whereof I hereto affix my signature.

LEWIS H. FALLEY.